United States Patent
Tseng

(10) Patent No.: US 6,439,593 B1
(45) Date of Patent: Aug. 27, 2002

(54) REAR SHOCK ABSORBING ASSEMBLY FOR A BICYCLE

(75) Inventor: Diing-Huang Tseng, Changhua Hsien (TW)

(73) Assignee: Merida Industry Co., Ltd., Changhua Hsien (TW)

( * ) Notice: Subject to any disclaimer, the term of this patent is extended or adjusted under 35 U.S.C. 154(b) by 0 days.

(21) Appl. No.: 09/899,838

(22) Filed: Jul. 9, 2001

(51) Int. Cl.[7] ............................................... B62K 25/28
(52) U.S. Cl. ....................................................... 280/284
(58) Field of Search ................................ 280/284, 285, 280/286, 283

(56) References Cited

U.S. PATENT DOCUMENTS

| | | | |
|---|---|---|---|
| 1,058,839 A | * | 4/1913 | Baldon |
| 1,283,030 A | * | 10/1918 | Ashton |
| 1,369,356 A | * | 2/1921 | Rigby |
| 1,594,079 A | * | 7/1926 | Tanner |
| 4,463,964 A | * | 8/1984 | Takayanagi et al. ........ 280/284 |
| 5,306,036 A | * | 4/1994 | Busby ......................... 280/284 |
| 5,678,837 A | * | 10/1997 | Leitner ....................... 280/284 |

FOREIGN PATENT DOCUMENTS

DE       3625099       *  1/1988

* cited by examiner

Primary Examiner—Avraham Lerner
(74) Attorney, Agent, or Firm—Fei-Fei Chao; Venable, Baetjer, Howard & Civiletti, LLP

(57) ABSTRACT

A rear shock assembly for a bicycle has a pair of chain stays, a pair of seat stays, a lever and a shock absorber. The pair of chain stays is pivotally connected to the frame of the bicycle. A rear fork tip is formed on one end of each chain stay. One end of each seat stay is pivotally connected to one of the rear fork tips. The lever is pivotally connected to the frame of the bicycle. The lever has a central connection point, a first end pivotally connected to the pair of seat stays and a second end. The shock absorber is pivotally connected between the second end of the lever and one of the rear fork tips. With such an arrangement, the leverage of the rear shock assembly is reduced and is nearly unity. The force applied to the shock absorber is reduced. The useful life of the shock absorber is prolonged.

5 Claims, 5 Drawing Sheets

REAR SHOCK ABSORBING ASSEMBLY FOR A BICYCLE

BACKGROUND OF THE INVENTION

1. Field of the Invention

The present invention relates to a shock absorbing assembly, and more particularly to a rear shock absorbing assembly for a bicycle, which has a leverage near unity.

2. Description of Related Art

To increase the comfort of riding a modern bicycle, a shock absorbing assembly is always mounted between the frame and the rear wheel of the bicycle. With reference to FIGS. 4 to 6, each of three types of conventional rear shock absorbing assemblies in accordance with the prior art comprises a rear fork (42) and a shock absorber (44). One end of the rear fork (42) is pivotally connected to the frame (40). The rear wheel (not shown) of the bicycle is rotatably mounted on the other end of the rear fork (42). The shock absorber (44) is pivotally connected between the frame (40) and the rear fork (42). Accordingly, when the rear wheel bumps an object, the rear fork (42) will pivot relative to the frame (40) and press the shock absorber (44). The shock absorber (44) can absorb the shock applied to the rear wheel to keep the shock from being transported to the frame (40). Riding the bicycle is more comfortable, and steering the bicycle is also improved.

However, the leverage of the conventional rear shock assembly is in the range of 2.5 to 5, where the leverage is a ratio of the distance between the center of the rear wheel and the pivot between the frame (40) and the rear fork (42) to the distance between the pivot between the rear fork (42) and the shock absorber (44) and the pivot between the frame (40) and the rear fork (42). In another words, when one-unit of force is applied to the rear wheel, there will be 2.5 to 5 units of force applied to the shock absorber (44). As the leverage of the rear shock assembly is increased, the shock absorber (44) must bear a larger force. When the leverage is large, the shock absorber (44) is easily damaged, and the useful life of the shock absorber (44) is reduced.

In addition, to bear a large force, a spring with a high coefficient of elasticity must be used in the shock absorber (44). The weight and the cost of the shock absorber (44) increases.

To overcome the shortcomings, the present invention tends to provide an improved rear shock assembly to mitigate or obviate the aforementioned problems.

SUMMARY OF THE INVENTION

The main objective of the invention is to provide an improved rear shock assembly for a bicycle, which has leverage near unity to reduce the force applied to the shock absorber. The rear shock assembly has a pair of chain stays, a pair of seat stays, a lever and a shock absorber. The chain stays are pivotally connected to a bicycle frame. A rear fork tip is formed on one end of each chain stay. One end of each seat stay is pivotally connected to one of the rear fork tips. The lever has a center connection point, a first end and a second end. The center connection point of the lever is pivotally connected to the bicycle frame. The pair of seat stays are pivotally connected to the first end of the lever. The shock absorber is pivotally connected between the second end of the lever and one of the rear fork tips. With such an arrangement and compared to the conventional rear shock absorber assembly, the leverage of the rear shock assembly is reduced to nearly unity. The force applied to the shock absorber is reduced. The useful life of the shock absorber is prolonged.

Other objects, advantages and novel features of the invention will become more apparent from the following detailed description when taken in conjunction with the accompanying drawings.

DETAILED DESCRIPTION OF PREFERRED EMBODIMENT

Figure 1:
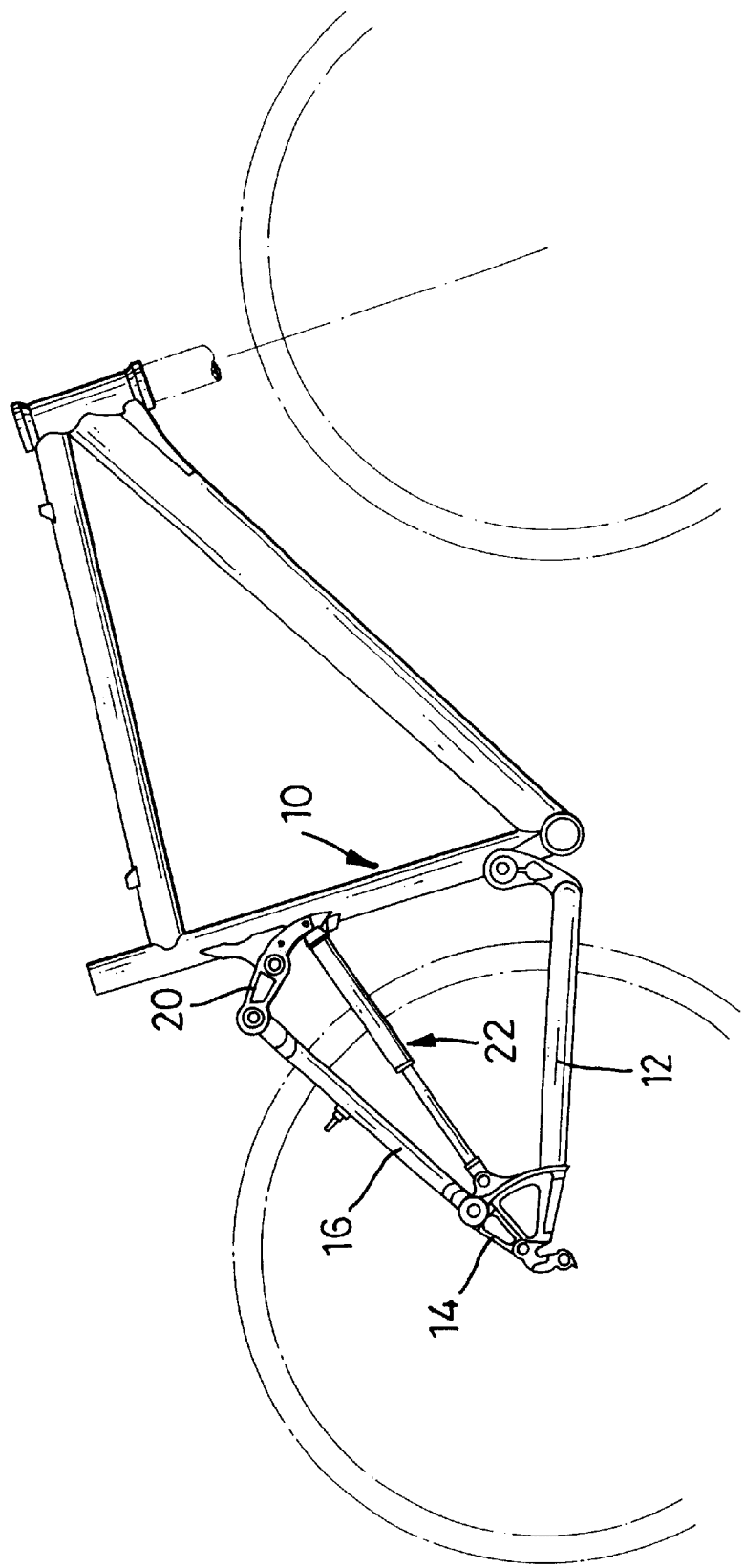
FIG. 1 is a side plan view of a bicycle frame with a rear shock absorber assembly in accordance with the present invention.
Figure 2:
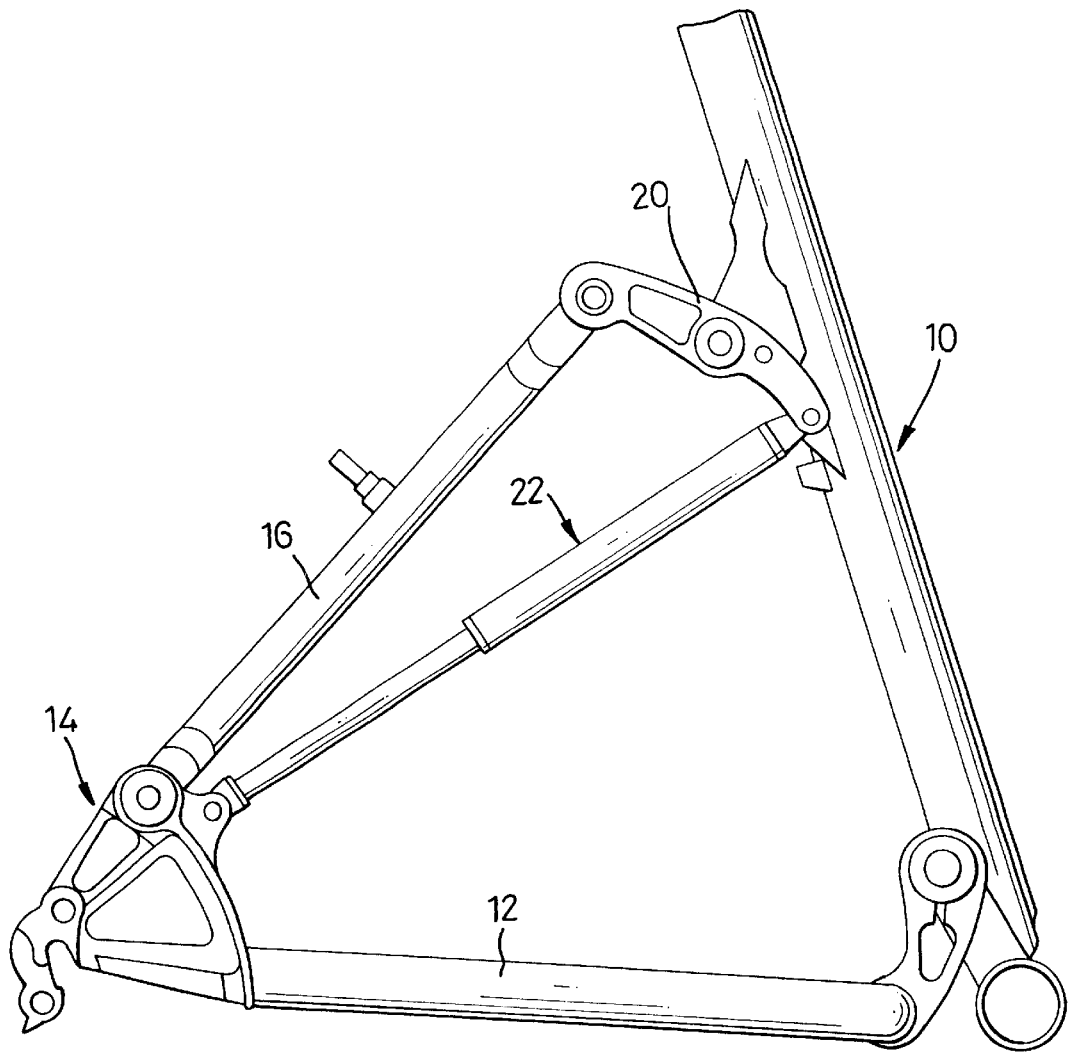
FIG. 2 is an enlarged side plan view of the rear shock absorber assembly in Fig. 1.

With reference to FIGS. 1 and 2, a rear shock assembly in accordance with the present invention comprises a pair of chain stays (12), a pair of seat stays (16). a lever (20) and a shock absorber (22). The chain stays (12) have a first end and a second end with the first end pivotally connected to a bicycle frame (.10) and a rear fork tip (14) formed on the second end. The rear wheel (not numbered) of the bicycle is rotatably attached to the rear fork tips (14). One end of each seat stay (16) is pivotally connected to one of the rear fork tips (14).

The lever (20) has a central connection point, a first end and a second end. The central connection point is pivotally connected to the bicycle frame (10). The first end of the lever (20) is pivotally connected to the pair of seat stays ( 16). The shock absorber (22) is pivotally connected between the second end of the lever (20) and one of the rear fork tips (14).

Figure 3:
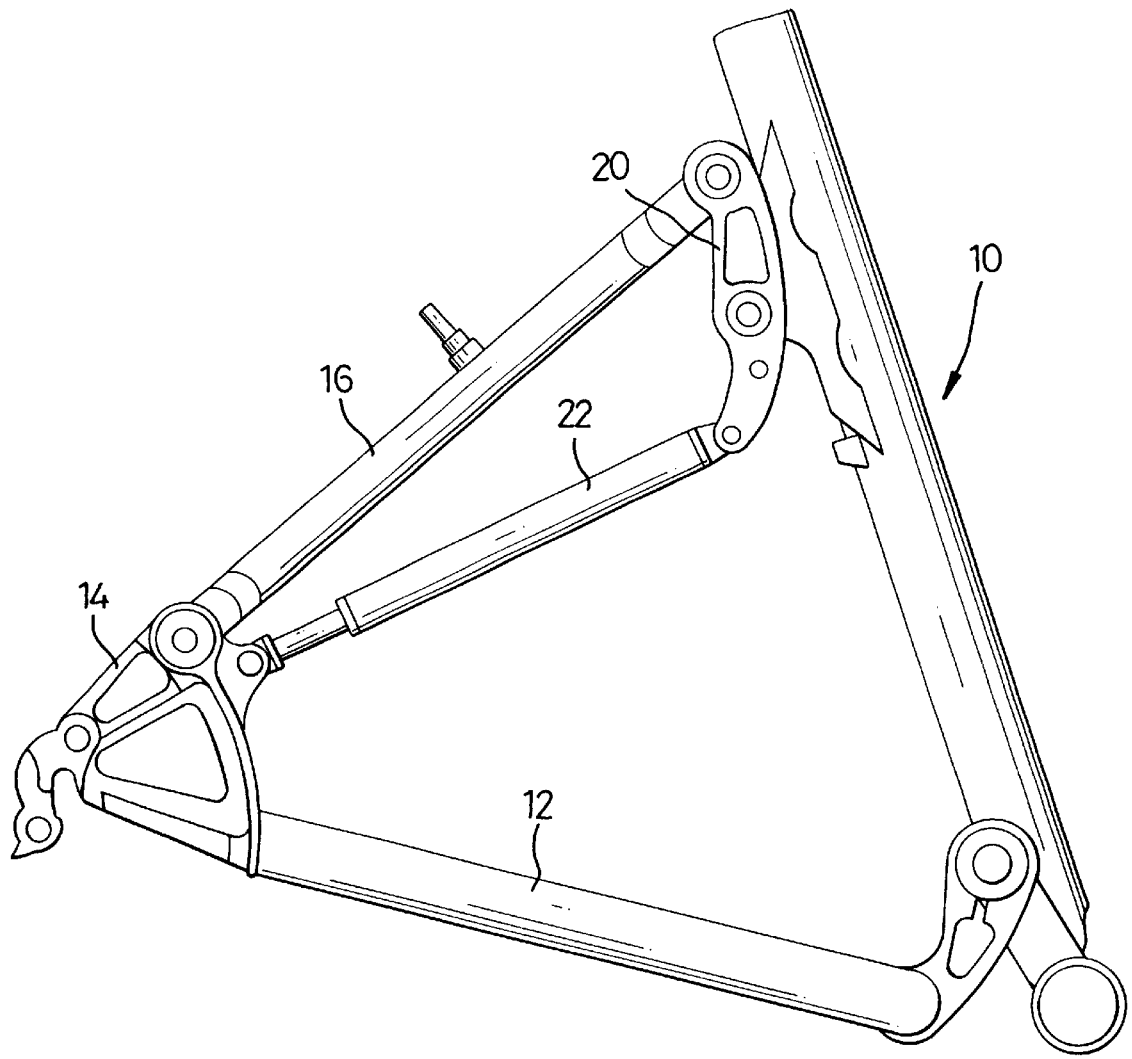
FIG. 3 is an operational side plan view of the rear shock absorber assembly in FIG. 1.
Figure 4:
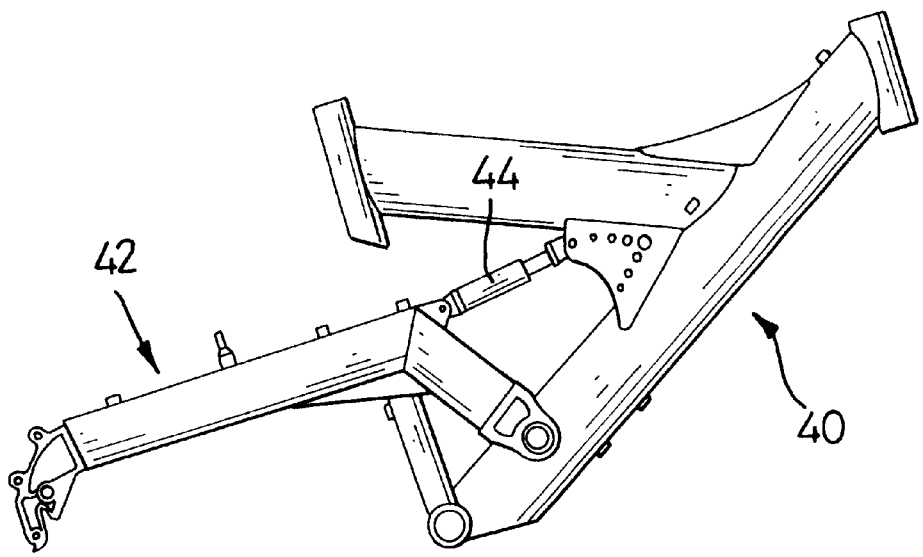
FIG. 4 is a side plan view of a first embodiment of a bicycle frame with a conventional rear shock absorber assembly in accordance with the prior art.
Figure 5:
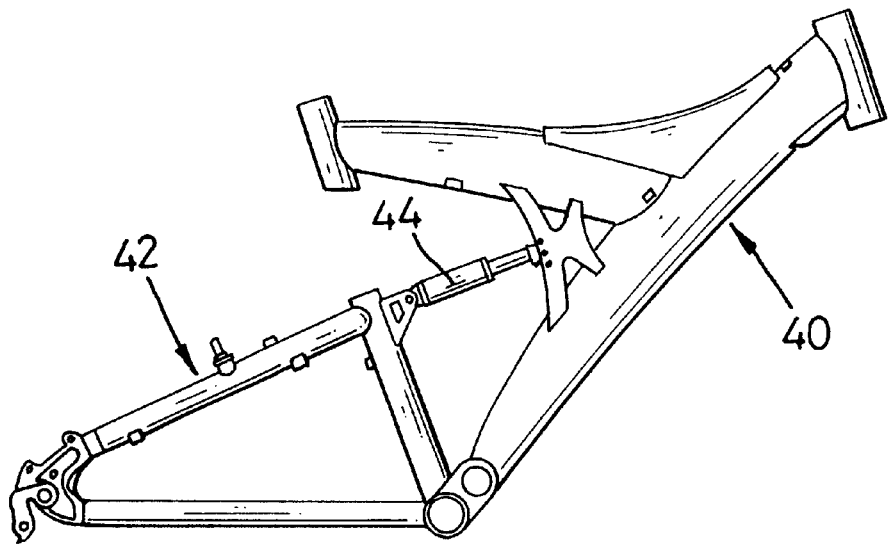
FIG. 5 is a side plan view of a second embodiment of a bicycle frame with a conventional rear shock absorber assembly in accordance with the prior art.
Figure 6:
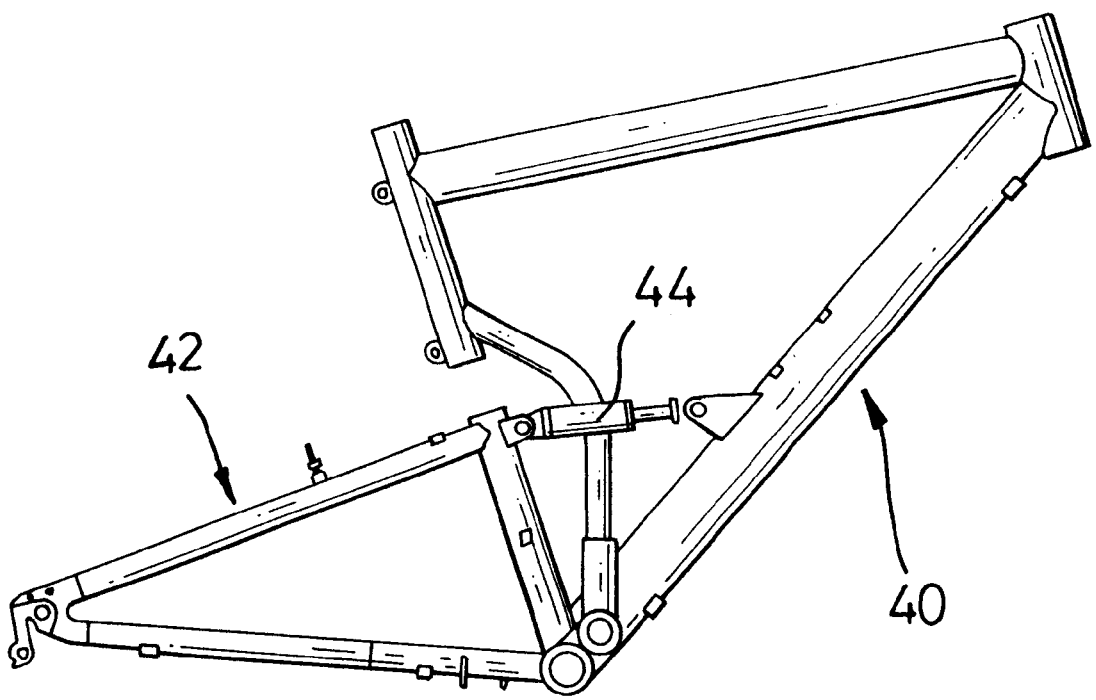
FIG. 6 is a side plan view of a third embodiment of a bicycle frame with a conventional rear shock absorber assembly in accordance with the prior art.

With reference to FIGS. 2 and 3, when the rear wheel bumps an object and a force applied to the rear wheel, the rear wheel and the chain stays (12) with the rear fork tips (14) will pivot relative to the frame (10). The lever (20) will pivot relative to the frame (10) when the first end of the lever (20) is pressed by the seat stays (16), and the second end of the lever (20) will compressed the shock absorber (22). This can keep the force from being transmitted directly to the frame (10), so riding the bicycle becomes more comfortable.

Because the seat stays (16) and the shock absorber (22) are respectively pivotally connected to the opposite ends of the lever (20) and the center of the lever (20) is pivotally connected to the frame (10), the leverage between the seat stays (16) and the shock absorber (22) is near unity, where the leverage is the ratio of the distance between the first end and the middle portion of the lever (20) to the distance between the second end and the middle portion of the lever (20). In another words, when one unit of force is applied to the rear w heel, the force applied to the shock absorber (22) is limited to very nearly one unit. Compared to the conventional shock absorber assembly, the force applied to the shock absorber (22) is reduced. The useful life of the shock absorber (22) will be prolonged.

Because the shock absorber (22) only needs to bear a small force when the bicycle is being ridden, a shock absorber (22) with a spring with a low coefficient of elasticity can provide a good shock absorbing effect to the bicycle. The weight and the cost of the shock absorber (22) are reduced. In addition, a hydraulic or a pneumatic shock absorber that always has a low shock absorbing effect can be used with the shock absorbing assembly.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A rear shock assembly for a bicycle comprising:

a pair of chain stays each having a first end and a second end, the first ends being pivotally connected to a frame of the bicycle and the second ends each having a rear fork tip formed thereon;

a pair of seat stays each having a first end and a second end, the first ends each being pivotally connected to one of the rear fork tips;

a lever having a central connecting point, a first end, and a second end; and a shock absorber being pivotally connected between the second end of the lever and one of the rear fork tips, wherein the lever is pivotally connected to the second ends of the seat stays at the first end of the lever, to one end of the shock absorber at the second end of the lever, and to the frame of the bicycle at a point that is neither the first end nor the second end of the lever.

2. The rear shock assembly as claimed in claim 1, wherein the lever is pivotally connected to the frame of the bicycle at the central connecting point of the lever.

3. The rear shock assembly as claimed in claim 1, wherein the shock absorber is attached with a spring.

4. The rear shock assembly as claimed in claim 1, wherein the shock absorber is a hydraulic shock absorber.

5. The rear shock assembly as claimed in claim 1, wherein the shock absorber is a pneumatic shock absorber.

* * * * *